Nov. 14, 1939.  J. J. ETTINGER  2,180,042
SUCTION AND IRRIGATION APPARATUS
Filed Dec. 13, 1937  2 Sheets-Sheet 1
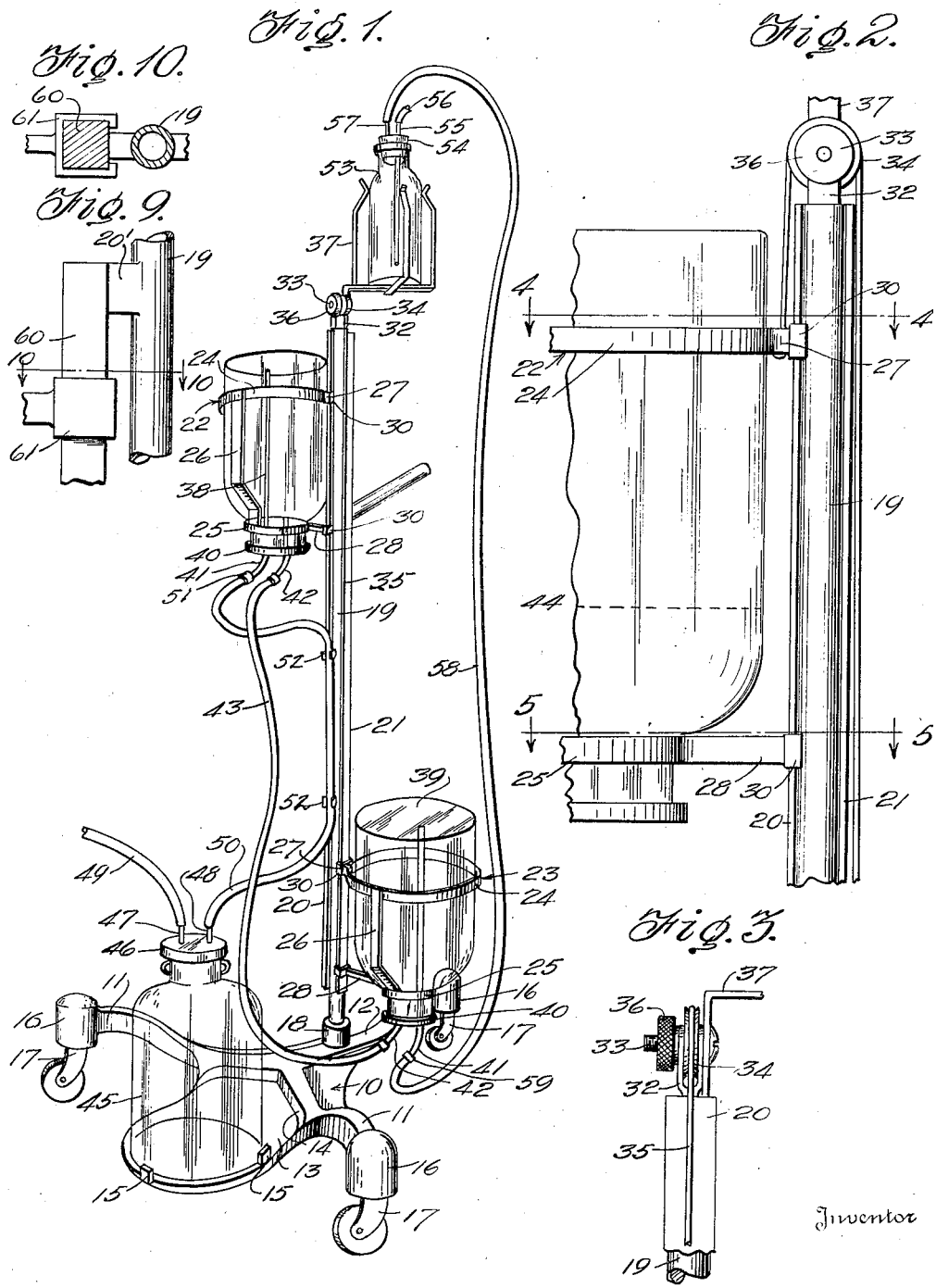
Inventor
JOE J. ETTINGER,
By
Attorney

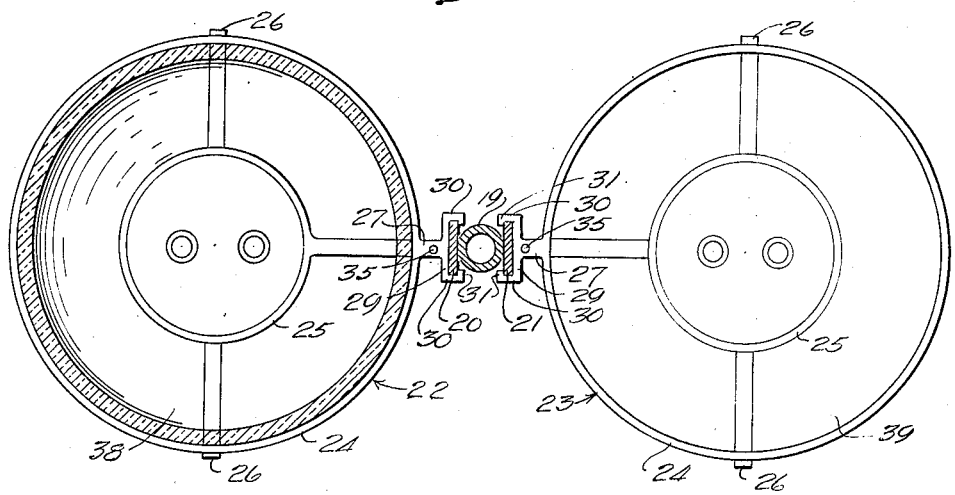

Patented Nov. 14, 1939

2,180,042

UNITED STATES PATENT OFFICE 2,180,042

SUCTION AND IRRIGATION APPARATUS

Joe J. Ettinger, Warsaw, Ind., assignor to Zimmer Manufacturing Company, Warsaw, Ind.

Application December 13, 1937, Serial No. 179,560

2 Claims. (Cl. 128—276).

This invention relates to an irrigation and drainage apparatus for use in surgical and medical treatments wherein it is desirable to irrigate a portion of a human body, to produce drainage of a body portion or to both irrigate and drain a body portion.

Devices for this purpose are known in surgical and medical practice but such devices are usually constructed with valves controlling the operations performed by the apparatus. It has been found by experience that the manipulation of a series of valves frequently results in improper adjustment of the valves so that the apparatus either fails to function or functions in an undesirable and sometimes injurious manner. Other apparatus for these purposes has been devised wherein a complex multiple valve controlled by a single lever or handle is used for flow control. Such multiple valves are expensive to manufacture and are inherently difficult to maintain in proper working condition.

It is one important object of the present invention to provide an irrigation and drainage apparatus of this class wherein all operations are effected without the use of any valves so that the apparatus forms a valveless irrigation and drainage apparatus.

Apparatus for this purpose is commonly provided with a pair of conduit connected bottles with a quantity of liquid in the system about sufficient to fill one of the bottles, the bottles being arranged at different elevations so that the fluid will flow from the upper bottles to the lower thereby producing air suction in the upper bottle and air flow from the lower bottle. These bottles are termed the power bottles of the apparatus and heretofore have been mounted on the ends of a swinging frame which is pivoted between its ends on a horizontal axis so that after the lower bottle is filled the frame may be swung to cause the lower and upper bottles to exchange positions whereby the liquid may again flow downwardly. Such a swinging frame necessarily requires considerable space for the swinging movement and the construction is complicated by the necessity of the valves having to be coaxial with the frame pivots or journals.

A second important object of the invention is to provide an improved valveless irrigation and drainage apparatus wherein the power bottles may be simultaneously shifted along perpendicular paths whereby the use of a swinging frame is rendered unnecessary and the space required by the apparatus is greatly reduced.

A third important object of the invention is to provide an improved apparatus of this character wherein the power bottles may be adjusted to any desired difference in elevation within the scope of the apparatus and there held whereby the suction and pressure obtained may be caused to suit the particular requirements of the case being treated.

A fourth important object of the invention is to provide an improved apparatus of this character having an irrigating fluid bottle and means for supporting such bottle in elevated and depressed positions selectively so that irrigation flow may be assisted by gravity when the bottle is elevated or may depend solely on the action of the power bottles when the irrigating fluid bottle is in depressed position.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a perspective view of the improved apparatus set up for both irrigating and drainage.

Figure 2 is an enlarged fragmentary side elevation showing the manner of supporting certain power bottles used in this apparatus.

Figure 3 is a fragmentary side elevation of the upper part of Figure 2 but taken at right angles thereto.

Figure 4 is a section on the line 4—4 of Figure 2 but showing more of the construction.

Figure 5 is a section on the line 5—5 of Figure 2.

Figure 6 is an enlarged detail axial section through the neck portion of one of the power bottles.

Figure 7 is a plan view of a portion of the base showing a modification of the bottle arrangement shown in Figure 1.

Figure 8 is a section showing the manner of securing together the base and standard of the apparatus.

Figure 9 is a side elevation of a portion of the invention showing a slight modification of certain parts.

Figure 10 is a section on the line 10—10 of Figure 9.

In the form of the apparatus shown in the accompanying drawings there is provided a trivet 10 or three armed base member having a pair of arms 11 and a third arm 12. The arms 11 extend at an obtuse angle to each other and in the angle between these arms is a platform 13. The upper parts of the arms 11 form a V-shaped wall 14 at the inner end of the platform and the outer end of the platform is provided with a series of lugs 15 arranged in spaced relation around a circle having a diameter such as to constitute a positioning seat for one of the bottles used herein as will be presently explained. The leg 12 preferably bisects the angle formed by the legs 11. On the outer end of each leg is formed a downwardly opening socket 16 wherein is carried a caster 17 of the usual swivelling variety. Thus the base may be easily rolled from place to place.

Extending upwardly from the arm 12 is a socket 18 wherein is secured the lower end of a vertical standard 19 preferably of tubular form. This standard is here shown as having screw connection with the socket but any preferred fastening means may be used to hold the standard in place. A pair of guide rails, here shown in the form of flat metal strips 20 and 21 are secured to standard 19 to extend longitudinally thereof, the securing being effected by any suitable means such as by screws, welding, brazing or otherwise. These guide strips are positioned to extend along diametrically opposite portions of the standard 19. The longitudinal edges of the guide strips are free from the standard. Slidably mounted on the guide strips 20 and 21 are bottle cages indicated in general at 22 and 23. Each of these bottle cages comprises an upper ring 24, a lower ring 25 and upright connecting straps 26 having their ends fixed to the respective rings. Extending from each upper ring 24 is a short arm 27 and extending from each lower ring 25 is a long arm 28, the rings having a common axis. Carried by each arm 27 and 28 is a slide of general C-shape and having a flat portion 29 extending transversely of the arm. Short flanges 30 extend at right angles to the portion 29 at the ends thereof and these flanges have inturned ends 31 extending toward each other and terminating in spaced relation. The flat portions 29 engage the outer faces of the guide strips 20 and 21, the flanges 30 engage the edges of these strips and the ends 31 engage the rear faces of the strips adjacent the edges thereof. Thus the bottle cages are mounted on the strips for vertical sliding movements in rectilinear paths.

Fixed in the upper end of the standard 19 is a yoke 32 having a bifurcated upper end through the arms of which extends a screw 33 forming a journal member. Journalled on the journal member 33 is a grooved pulley 34 over which is trained a flexible cable 35 having its respective ends suitably connected to or anchored in the short arms 27. The length of this cable 35 is such that one bottle cage will be at the lower limit of movement on its guide strip when the other bottle cage is at the upper limit of its guide strip. This cable forms the supporting means for the bottle cages and connects these cages in such manner that downward movement of one cage causes upward movement of the other cage. A clamping nut 36 is screwed on the journal member 33 and by rotating this nut in the proper direction the arms of the yoke 32 are drawn towards each other to grip the pulley 34 and thus prevent rotation thereof. The metal of the yoke is sufficiently resilient to cause the arms to spread upon unscrewing the nut 36 whereby the pulley 34 is permitted to rotate. This clamping arrangement functions to inhibit movement of the cable 35 when desired so that the bottle cages may be held in any position of adjustment and the cages may thus be held in any desired vertical spacing. Mounted on the upper end of the standard 19 is a fixed bottle cage or holder 37.

The cages 22 and 23 hold the bottles 38 and 39 respectively. As will presently be seen these bottles act to supply the power by which suction is produced for drainage and pressure for irrigation. These bottles are therefore termed power bottles. Each of these bottles has its body held by an upper ring 23 and its neck supported in a lower ring 24, the bottles thus being in inverted positions. Each of these bottles has a suitable closure 40 which carries an air tube 41 extending from the closure to a point closely adjacent the bottom of the bottle which, as held in its cage, is uppermost. The closure 40 also carries a short tube 42 which terminates upwardly close to the closure 40. The lower ends of the tubes 41 and 42 project below the closures. The lower ends of the tubes 42 are connected by a flexible pipe 43 at all times during the operation of the apparatus. The two power bottles contain, when in use a volume of liquid, such as water, sufficient to fill one of the power bottles to a point just below the upper end of the tube 41 of that bottle. As will be presently understood there are conditions in the operation wherein the liquid is all in one bottle and other conditions wherein the liquid is partly in one bottle and partly in the other. This liquid is indicated at 44. The platform 13 is for supporting a drainage or trap bottle 45 which is positioned on the platform by the lugs 15. This trap bottle is provided with a removable closure 46 carrying short tubes 47 and 48. These tubes terminate downwardly just below the closure 46. On the tube 47, when the device is used for drainage purposes, is fitted one end of a flexible drainage tube 49 which is of such length as to reach the area to be drained. On the tube 48 is fitted one end of a suction tube 50 which carries at its other end a suitable connection 51 such as is best shown in Figure 6 whereby it may be selectively connected to coacting parts carried by the tubes 41. Preferably the tube 50 is supported by tube clips 52 fixed on the standard 19.

The cage 37 is for supporting an irrigation fluid bottle 53 having a closure 54 which carries a long tube 55 terminating downwardly at a point adjacent the bottom of the bottle and projecting upwardly through the closure. Connected to the upper end of the tube 55 is an irrigating tube 56 of such length as to reach the area to be irrigated when such irrigation is indicated. The closure 54 also carries a short tube 57 which opens downwardly just below the closure 54 and projects upwardly from this closure. On the upper end of this tube is fitted one end of a flexible tube 58 which carries at its other end a connection 59 like the connection 51 and like it selectively connectable with the coacting parts of the tubes 41. The irrigation bottle is for the reception of any irrigating fluid or medicament a physician may find indicated for a particular treatment of a patient. It is to be noted that the bottle 53 may be carried in the cage 37 or may, as shown in Figure 7, be placed on the platform 13, being held from dislodgment by the bottle 45 and wall 14. When in the cage 37 the bottle will be at a higher elevation than the patient and flow therefrom will take place (when started) or be assisted by syphonic action. When the bottle 53 is on the platform the flow will only take place by forcing the irrigating fluid upwardly.

In order to explain the operation of the apparatus let it be supposed that the power bottle 38 contains all the power fluid and that the power bottle 39 contains only air. Also let it be assumed that the parts are in the position shown in Figure 1 and the irrigating fluid is in the bottle 53. Under these conditions gravity will cause the power fluid to flow down the tube 43 to the bottle 39, the fluid entering the bottle 39 from below. This will tend to compress the air in the bottle 39 and this air under pressure will flow through the tube 58 and enter the upper part of the bottle 53 which will force the irrigating fluid out of the bottle 53 and through the tube 56 to the area to be irrigated. Also, the flow of power fluid from the bottle 38 will tend to produce a partial vacuum in the upper part of that bottle which will cause air to flow from the trap bottle 45 through the tube 50 and thus tend to produce a partial vacuum in the bottle 45. This will cause suction on the tube 49 and matter from the drainage will pass along tube 49 and be collected in the trap bottle 45. Preferably this bottle 45 is of greater capacity than either power bottle so that no danger exists of the drainage substance filling the bottle 45 and flowing up the tube 50. If drainage alone is desired the tube 58 may be disconnected from the bottle 39 and when irrigation alone is desired the tube 50 may be disconnected from the bottle 38. The bottle 38 may be positioned at any desired height above the bottle 39 and thereby the force and rapidity of the irrigation or drainage may be controlled. As here shown, the irrigation bottle is of less capacity than the power bottle 38 or 39 but the bottle 53 may be replaced by a container of any desired capacity which may rest on the platform or even on the floor.

When continuous irrigation or drainage is indicated the parts may be initially arranged as in Fig. 1 and the operation carried out until all the power fluid has collected in the lower power bottle 39. Upon this stage in the operation being reached the connections of the tubes 50 and 58 are transposed, the tube 50 being connected to the power bottle 39 and the tube 58 to the power bottle 38. The clamping nut 36 is now released and the power bottle 39 elevated to the height formerly held by the power bottle 38 and the nut tightened. The operation will now continue, the power fluid flowing as before from the upper to the lower bottle. Obviously, when the trap bottle is sufficiently filled the operation may be stopped by bringing the power bottles to points at which the fluid contents are at the same level, the closure 46 detached, the bottle 45 removed and replaced by an empty bottle and the parts rearranged in their former positions.

It is particularly to be noted that these operations are conducted without the necessity of manipulating valves, there being no valves in the apparatus. It will also be noted that the power bottles move in vertical rectilinear paths so that little more room is required for operating the apparatus than the floor area necessary to accommodate the two power bottles. Thus the base can be made to occupy but little floor space and the device can be used in close quarters which would not permit the use of apparatus wherein the power bottles are supported on a swinging frame.

In the modification shown in Figures 9 and 10 the standard 19 is provided with lugs 20' which support square guide bars, one of which is shown at 60. In this case the C-shaped slides are replaced by square tubes sliding on the square guide bars. Otherwise, the invention is as previously described.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In apparatus for irrigation and drainage, a pair of power bottles, vertical rectilinear guides for said bottles, cages holding said bottles and mounted on said guides to move therealong, tube means connecting the lower ends of said bottles, a pulley at the upper end of said guides, a cable trained over said pulley and having its ends secured to respective cages, means for holding said pulley releasably against rotation, said cages holding said power bottles in inverted position and the tube affording constant communication between the bottles, and air admission and escape tubes entering said bottles from their lower ends and terminating upward in proximity within the upper ends of said bottles, a second pair of bottles each having an air tube entering its upper part, and constantly open tube means carried by the last mentioned bottles, and said open tube means being interchangeably connectable with said bottles and establishing selective communication between the bottles of the first pair and the bottles of the second pair.

2. In apparatus for irrigation and drainage, a pair of power bottles, vertical rectilinear guides for said bottles, cages holding said bottles and mounted on said guides to move therealong, tube means connecting the lower ends of said bottles, a pulley at the upper end of said guides, a cable trained over said pulley and having its ends secured to respective cages, a yoke wherein said pulley is mounted, means to force the arms of the yoke toward each other to clamp said pulley and prevent rotation thereof, said cages holding said power bottles in inverted position and the tube affording constant communication between the bottles, and air admission and escape tubes entering said bottles from their lower ends and terminating upward in proximity within the upper ends of said bottles, a second pair of bottles each having an air tube entering its upper part, and constantly open tube means carried by last mentioned bottles, and said open tube means being interchangeably connectable with said bottles and establishing selective communication between the bottles of the first pair and the bottles of the second pair.

JOE J. ETTINGER.